Feb. 8, 1955     T. P. MOTTLEY ET AL     2,701,876
OSCILLOGRAPHIC ANTENNA PATTERN RECORDER
Filed Feb. 26, 1952     5 Sheets-Sheet 2

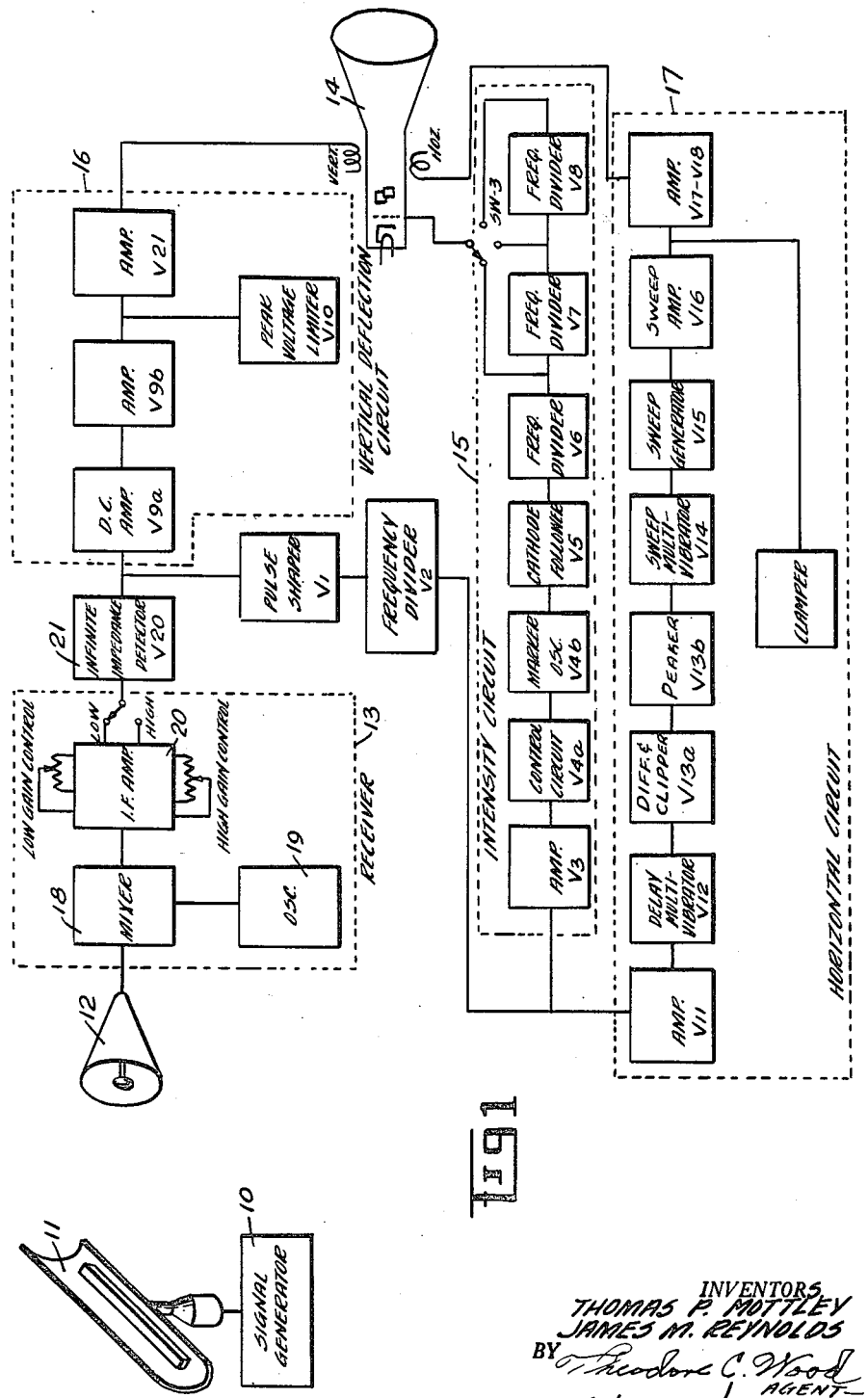

INVENTORS.
THOMAS P. MOTTLEY
JAMES M. REYNOLDS
BY Theodore C. Wood
AGENT
Wade Roonty
ATTORNEY

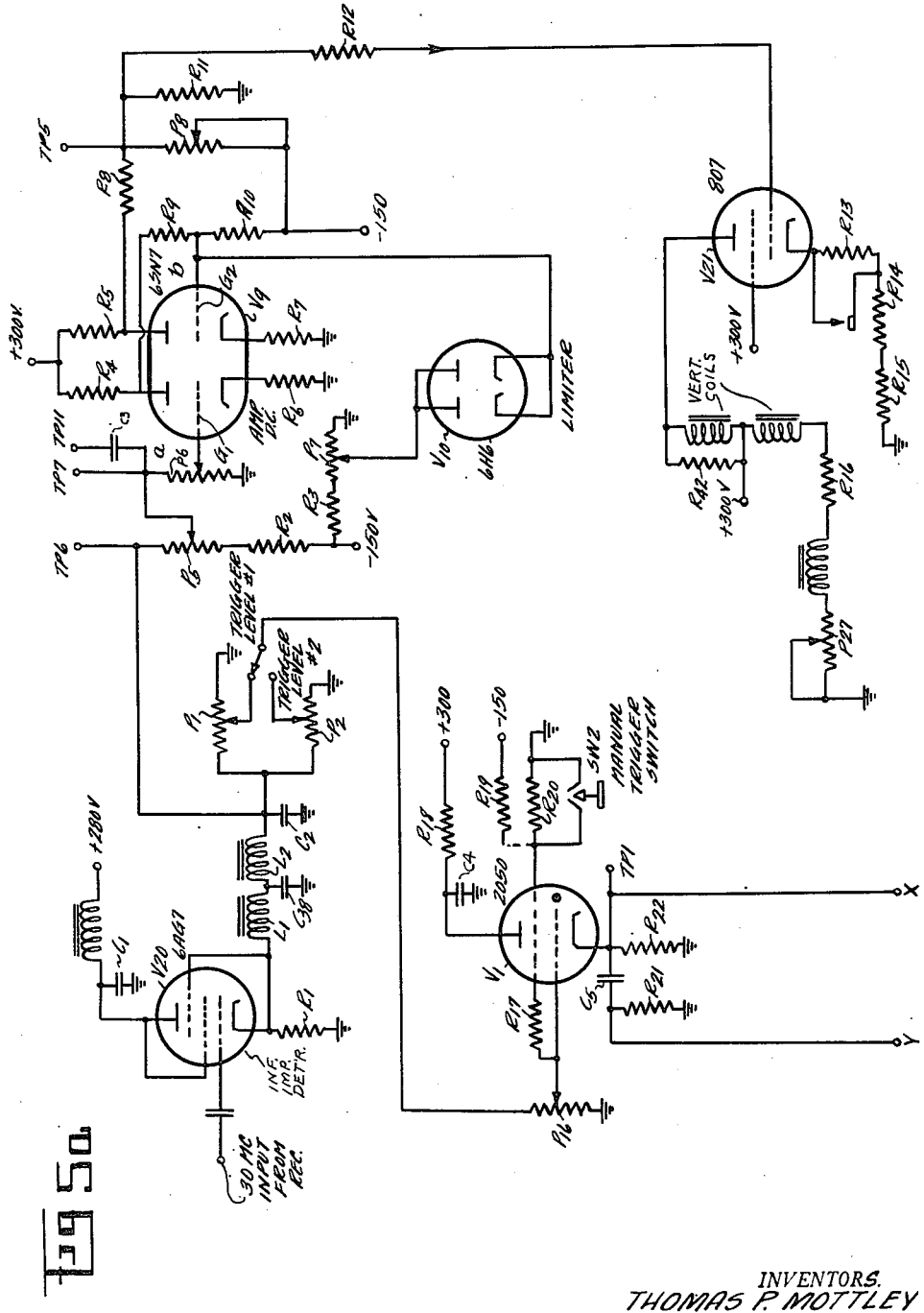

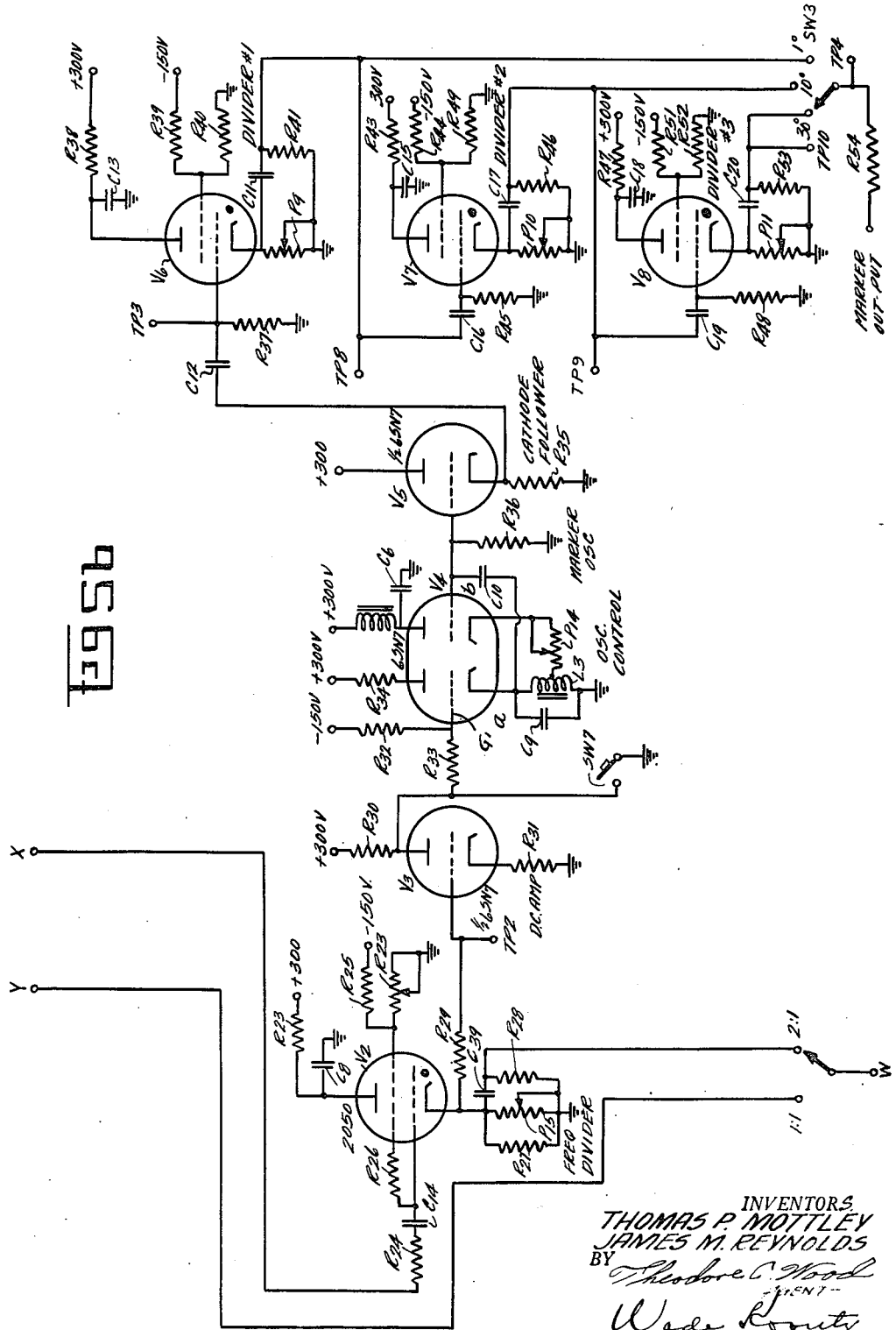

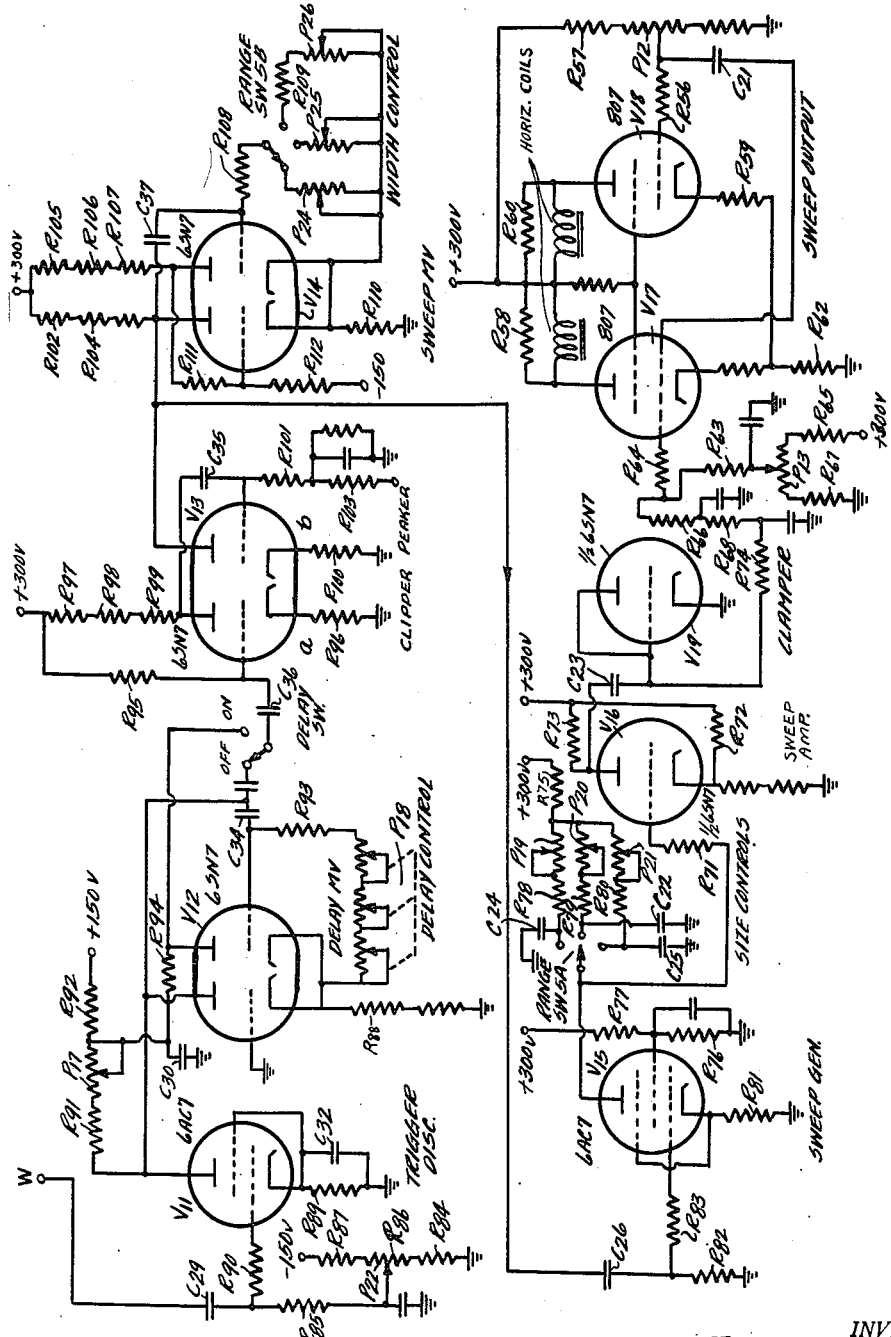

United States Patent Office 2,701,876
Patented Feb. 8, 1955

2,701,876

OSCILLOGRAPHIC ANTENNA PATTERN RECORDER

Thomas P. Mottley and James M. Reynolds, Long Branch, N. J.

Application February 26, 1952, Serial No. 273,535

7 Claims. (Cl. 343—100)

(Granted under Title 35, U. S. Code (1952), sec. 266)

The invention described herein may be manufactured and used by or for the Government for governmental purposes without payment to us of any royalty thereon.

This invention relates to measuring and indicating the radiation pattern of an antenna and more particularly to apparatus for automatically indicating the radiation pattern of an antenna.

In the art of determining the radiation pattern of an antenna, it is the usual practice to mount the radiating antenna in a fixed position and then with a portable field strength meter record the field strength at various points around and at certain distances from the antenna. Those recordings are then plotted on a graph using either rectangular or polar coordinates. With such a hand plotted point-to-point measurement method it may require as much as 20 man-days to produce the final antenna pattern.

In accordance with this invention the radiating antenna is rotated at a predetermined and substantially constant rate, a receiving antenna is fixedly mounted at a suitable distance from the radiating antenna, the signals from the receiving antenna after suitable amplification are used to deflect the beam of a cathode ray tube in a predetermined direction while the beam of the cathode ray tube is being deflected in another predetermined direction in synchronizing with the rotation of the radiating antenna. The cathode ray tube will thus present a graph in rectangular coordinates of the radiating pattern of the radiating antenna.

It is an object of this invention to provide an apparatus for measuring and indicating the radiation pattern of an antenna which will produce an indication substantial instantaneously.

It is a further object of this invention to provide an oscillographic antenna pattern indicator which will have its sweep automatically synchronized with the rotation of the radiating antenna.

It is still a further object of this invention to provide an oscillographic antenna pattern indicator in which the calibration of the oscilloscope will be reliable and readily indicated for simultaneous viewing with the face of the oscilloscope.

The above objects, as well as other objects, features and advantages of this invention will be more fully understood in view of the following description when taken in conjunction with the drawings wherein:

Fig. 1 is a block diagram of an oscillographic antenna pattern recorder constructed in accordance with the principles of this invention.

Figure 3:
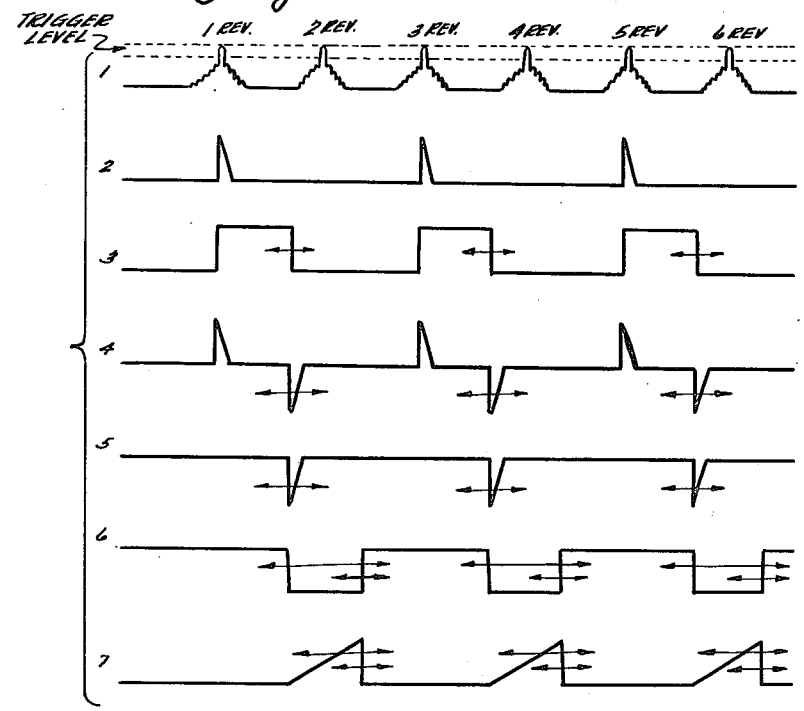
Fig. 3 is a family of curves indicating potentials at various points throughout the sweep circuit of the oscilloscope.

Figs. 5a, 5b and 5c, together form a simplified schematic diagram of certain of the circuits illustrated in blocked form in Fig. 1.

Referring now to Figure 1, the antenna to be tested is energized by a suitable signal generator 10 which has been adjusted to produce a low power continuous wave signal of the frequency for which the antenna 11 is designed. With the antenna 11 of the radar set energized by the signal generator, the antenna is then rotated at a predetermined and substantially constant speed. Normally the speed of rotation will be from 4 to 30 revolutions per minute.

The recording equipment including the pick-up antenna 12 is set up at a point remote from the sight of the rotating antenna. This distance is determined by the power output of the signal generator used to energize the antenna under test.

The antenna pattern indicating equipment consists of a pick-up antenna 12, a conventional receiver 13 and an oscillographic indicator 14, together with suitable intensity 15 and deflection circuits 16 and 17. The pick-up antenna is used for detecting the power variations as the radiating antenna rotates and is designed to operate at the working frequency. The receiver is of conventional design, comprising mixer 18, local oscillator 19 and intermediate frequency amplifier 20, and its output is applied to an infinite impedance detector 21 and the unidirectional voltage output of the infinite impedance detector is then used to operate the horizontal and vertical deflection circuits as well as the intensity circuits of the oscilloscope.

Figure 2:
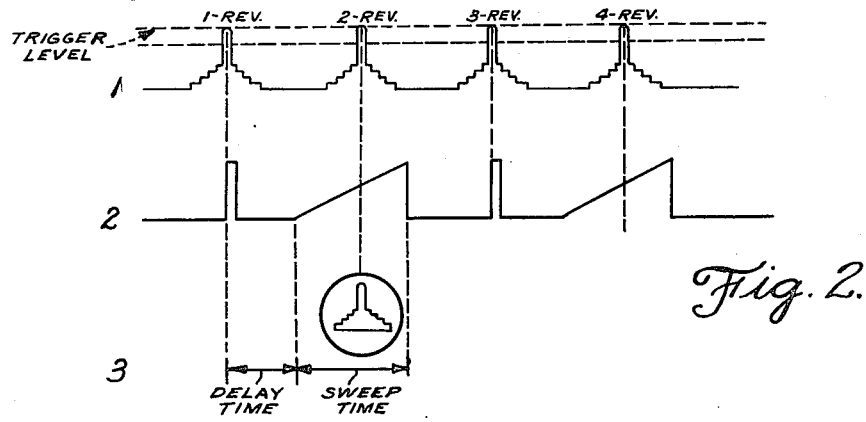
Fig. 2 is a family of curves illustrating the operation of the sweep circuit for the oscilloscope.

Referring now to Figure 2, the signals emanating from the rotating antenna can be considered as a series of recurring antenna patterns. If the receiver pick-up antenna is located within the field of the rotating radiation pattern of the antenna under test, the energy detected can be represented by the wave form shown as 1 in Figure 2 and since the direct current output voltage of the infinite impedance detector is proportional to the input signal at the pick-up antenna the direct current voltage output will vary in amplitude directly with the radiation pattern of the antenna under test.

To present the radiation pattern on the oscilloscope screen in rectangular coordinates, the horizontal deflection of the oscilloscope must be interpreted in terms of degrees of rotation of the antenna under test. It is necessary, therefore, that the speed of the electron beam as it moves across the screen be equal to the speed at which the antenna is rotating. Furthermore, it is necessary that the starting point of the electron beam be identical for each revolution of the antenna.

These requirements are accomplished by reducing the varying output of the infinite impedance detector to a value which will remove all the minor voltage variations caused by the side and back lobes of the radiation pattern, leaving only the major voltage swing produced by the pattern main lobe. The voltage swing can be considered as a trigger pulse which will occur at 360° intervals of the rotation of the antenna under test as shown in referenced waveform number 2 of the Figure 2. Since the trigger pulse occurs at the peak of the main lobe of the radiation pattern, the start of the horizontal sweep excursion must be delayed until the next revolution of the antenna if the entire radiation pattern is to be brought into view on the indicator screen.

This is shown in Figure 2 waveform number 3, and it is seen that the entire radiation pattern of the antenna is presented only on every other revolution of the antenna. In this way the need for interconnecting cabling between the rotating antenna mount and the record equipment is eliminated.

Horizontal sweep

To produce the required sweep voltages for the system, the received test pattern is reduced in level to a value which will leave only the major voltage swing produced by the peak of the main lobe of the test pattern.

Referring now to Figure 1 and also to Figures 5a, 5b and 5c which show circuit details of parts of Figure 1, the output of the receiver is applied to the control grid of tube V20 which together with its associated circuit form an infinite impedance detector. The output of the infinite impedance detector is applied to the control grid of tube V1 which together with its associated circuit form a pulse shaping circuit. Since the intermediate frequency amplifier of the receiver is normally provided for operation at low and high gain level, it is necessary to provide two separate trigger level attenuators. Potentiometers P1 and P2 which are in the control grid circuit of tube V1 serve this purpose and, therefore, the voltage applied to the control grid of tube 1 is determined by the setting of P1 (low gain trigger level control) or P2

(high gain trigger level control). This will insure a constant level energizing signal at the grid of V1 regardless of the operating level of the intermediate frequency amplifier of the receiver.

The appearance of a trigger pulse at the grid of tube V1 causes the tube to conduct heavily, thus impressing most of the 300 volt plate supply voltage across the cathode resistor R21. The voltage drop across plate resistor R18 will increase during the heavy conduction of V1, resulting in a lowering of the plate voltage. When the plate voltage is dropped to a sufficient value, de-ionization will occur resulting in a lowering of the cathode to ground potential across R21.

In this way a positive pulse of approximately 200 volts is produced across resistor R21 for each trigger pulse applied to the grid of V1. This pulse is then applied to the grid of V2 whose operation is similar to that of V1 except that the positive pulse appearing across the cathode resistor network P15, R27 is used to charge condenser C39. Because of the high time constant of this cathode resistor network, C39 is permitted to discharge slowly, thus producing an additional bias at the control grid of tube V2. This additional bias is used to hold the grid below the firing potential of the tube until the following trigger pulse has passed. The tube is then cleared for the third pulse and the cycle is repeated. In this manner V2 produces one pulse for every two applied to its grid and, therefore, operates as a frequency divider stage. The output waveform of this stage taken between the junction of R28 and C39 and ground is shown in Figure 3 of waveform 2. The output V2 between the junction of R28 and C39 and ground is then applied to tube V11 which together with its associated circuit form an inverter stage to produce a negative pulse required by the delay multivibrator stage including tube V12. Tube V12 and its associated circuit is a conventional multivibrator circuit whose output consists of a positive pulse, variable in width to approximately 22 seconds.

The output waveform of the delay multivibrator is shown as waveform number 3 in Figure 3; the output of this stage is a square wave with the trailing edge adjustable in time by circuit constants including potentiometer P18. A delay on-off switch is included in the delay multivibrator stage to facilitate initial adjustment of other circuits, as will be explained later. Normal operation of this circuit is with the delay switch in the on position.

The output of the delay multivibrator is then differentiated and a pulse formed by the leading edge and another pulse of opposite polarity is formed by the trailing edge, these pulses are shown in waveform number 4 of Figure 3. The positive pulse formed by the leading edge is then clipped by tube V13a and its associated circuit leaving only the negative pulse whose position in time is dependent upon the pulse width of the delay multivibrator. The output of the tube V13b and its associated circuit is shown as waveform number 5 in Figure 4. This pulse is then used to operate the sweep multivibrator consisting of tube V14 and its associated circuit. The output of the sweep multivibrator stage is a square wave which occurs in time dependent upon the circuit constants of the delay multivibrator which includes tube V12. Furthermore, the pulse width of the output of the sweep multivibrator stage is adjustable by circuit constants including potentiometers P24, P25 and P26. The output of the sweep multivibrator stage is shown as waveform number 6 in Figure 3.

The output pulse from the sweep multivibrator is applied through an obvious circuit including condenser C26 and R82 to the control grid of tube V15 which together with its associated circuit form a sweep generator. The output of the sweep generator stage is shown as waveform number 7 of Figure 3 and is essentially a sawtooth wave. The amplitude of the sawtooth wave is determined by the setting of potentiometers P19, P20 and P21. The starting time of the sawtooth wave is determined by the time of occurrence of the sweep multivibrator output pulse and the time duration of the sawtooth wave is determined by the time duration of the output pulse from the sweep multivibrator. The horizontal sweep speed of the electron beam of the cathode ray tube is determined by the setting of switch SW5A. Increasing the horizontal sweep speed is desirable when portions of the test pattern are to be viewed independently of the entire pattern. This feature is particularly valuable when measuring main or side lobe beam widths of narrow beam antennae.

The sawtooth waveform from the output of the sweep generator is applied to the control grid of tube V16 which together with its associated circuit form a conventional sweep amplifier stage and the output of the sweep amplifier is applied to the control grids of tubes V17 and V18 which together with their associated circuits form additional amplification for the sweep voltage. To insure stable operation and the return of the electron beam to its original starting point after a voltage excursion, a conventional clamper stage including tube V19 is connected to the input circuits of tubes V17 and V18 to discharge completely the high value coupling capacitor required for transmission of a 20 second sawtooth wave shape.

From the above it will be apparent that the beam of the cathode ray tube shown in Figure 1 will be swept horizontally once for every second trigger pulse and, furthermore, the time of occurrence of this sweep may be adjusted by potentiometer P18 in the delay multivibrator stage, so that the sweep of the cathode ray tube will start at any particular angular position of the rotating radiating antenna to be tested. Normally the angular position selected will be geographical north, furthermore, the length of time from the start to finish of the sweep of the cathode ray tube may be adjusted to any desired time by means of potentiometers P24, P25 and P26 in the sweep multivibrator circuit. Normally those potentiometers are so adjusted that the time required for the beam of the cathode ray tube to make a full sweep will be made equal to the time required for the rotating radiating antenna under test to make a full revolution.

*Intensity circuit*

In order that the cathode ray tube may be provided with calibration markers for the sweep deflection, the intensity circuit of Figure 1 is provided. This intensity circuit will provide a means to interpret the radiation pattern of the antenna under test.

As shown in Figure 1, the output of the receiver is applied to the infinite impedance detector whose output is modified by the pulse shaper and then this series of pulses from the output of the pulse shaper is applied to a frequency divider and the output of the frequency divider is simply a single pulse for each two pulses from the output of the receiver. This pulse is used to initiate the intensity circuit as well as the horizontal circuit. The intensity circuit, shown in Figure 1 in blocked form, will be more fully understood with reference to Figure 5b in which the amplifier or first stage of the intensity circuit is shown as the circuit including V3. It will be noted that the output pulse from the frequency divider stage including tube V2 is applied to the control grid of tube V3. Tube V3 and its associated circuit form a conventional D. C. amplifier whose output is applied to control grid G1 of the first section of tube V4. The first section of tube V4 together with its associated circuit form a conventional amplifier and control circuit for the second section of tube V4 which together with its associated circuit form an oscillator which will generate the calibration markers which will appear as variations in intensity of the beam of the cathode ray tube. The stage including the first section of tube V4 is normally conducting heavily thus damping out any oscillations generated by the stage including the second section of tube V4 and its associated tank circuit L3, C9. The first section of tube V4 is effectively cut off by the negative pulse output of the stage including tube V3, permitting the oscillator stage to function. The oscillator stage including the second section of tube V4 will generate a sine waveform voltage having a frequency dependent upon the speed of rotation of the radiating antenna. When switch SW7 is closed, the positive bias is removed from the grid G1 of the first section of tube V4, permitting continuous operation of the oscillator during the horizontal calibration procedure to be described later. The switch SW7 is returned to its normal open position upon completion of the calibration and the oscillator stage including the second section of tube V4 is synchronized with the rotation of the test antenna pattern, as already described.

The output of the second section of tube V4 is then applied to the control grid of tube V5 which together with its associated circuit form a cathode follower or coupling stage and the output of the cathode follower is applied to the control grid of tube V6. Capacitor C11 is charged by the heavy conduction current of tube V6 upon the arrival of the initial cycle of the audio frequency signal generated by the oscillator stage including the second section of tube V4. The discharge path of capacitor C11 is through the cathode potentiometer P9 across which an additional bias is produced by the discharging of capacitor C11. The discharge time is controlled by potentiometer P9 and this discharge time is adjusted to maintain the additional bias on the grid of tube V6 long enough to permit passage of three additional cycles of the input signal. The tube V6 and its associated circuit therefore, form a frequency divider stage producing one (1) positive pulse for every four (4) cycles of input signal. In other words, the output of the oscillator including the second section of tube V4 is divided by the circuit including tube V6 such that 360 pulses are produced for each input trigger pulse and this output appears at terminal marked 1° of switch SW3. This output is also applied to the control grid of tube V7 which together with its associated circuit form a frequency divider stage, similar to the frequency divider stage including tube V6, and the time constants of that stage are so selected that for each 36 input pulses, one output pulse will be produced, this output pulse will appear at the terminal marked 10° of switch SW3. This output pulse is also applied to the control grid of tube V8 which together with its associated circuit form another frequency divider circuit having such time constants that for each three pulses of input one output pulse will be produced and this output pulse will appear at terminal marked 30° of switch SW3. Referring now to Figure 1, the switch SW3 is connected to the beam intensity control electrode of the cathode ray tube.

From the above description, it will be seen that beam intensity is increased and decreased cyclically at a rate determined by the frequency of the marker oscillator stage as modified by the selected frequency divider, furthermore, the cyclic increase and decrease of the cathode ray tube intensity is synchronized with the received signal.

Vertical deflection

As previously discussed, the pattern of the rotating antenna under test can be considered as a series of recurring antenna patterns whose repetition rate will vary directly with the rotating speed of the antenna under test.

The power level variations of the antenna patterns are introduced into the receiving system by means of the pick-up antenna at the recording site and are then converted into an intermediate frequency by means of the oscillator and mixer. This intermediate frequency signal is then amplified by the intermediate frequency amplifier preferably having a provision to operate the amplifier at two separate levels since the screen of the cathode ray indicator will not usually accommodate the entire range of power levels of the antenna test pattern.

Thus if measurements are to be made concerning the main lobe peak values of the test pattern, it will contain relatively high levels of power, it is necessary to operate the intermediate frequency amplifier at the low gain operating level. To bring the weaker back and side lobes into view it is nesessary to operate the amplifier at the high gain operating level. These separate operating levels are calibrated individually and, therefore, measurements of the test pattern at both these levels are relative to each other and logical results are obtained. The output of the intermediate frequency amplifier is then detected by an infinite impedance detector with the input signal at the receiving antenna.

Referring now to Figure 1 and Figure 5a, it will be seen that the output of the infinite impedance detector, which is the stage including tube V20, is a varying D. C. voltage which is developed across resistor R1 and extraneous receiver noise is rejected by the low pass filter network comprising inductors L1, L2 and capacitors C2 and C38. This varying D. C. voltage is applied across potentiometer P5 and resistor R2 and that voltage is then impressed across potentiometer P6 which balances out the residual no-signal voltage developed by the no-signal plate current of tube V20. The signal from potentiometer P6 is applied to the grid of the first section of tube V9 which together with its associated circuit forms a D. C. amplifier. The signal applied to grid G1 of tube V9 is a signal which varies from zero volts to the maximum value determined by the main lobe peak power which may be in the order of 35 volts positive. The output voltage of the D. C. amplifier stage is developed across potentiometer potential divider R9—R10 and this signal is applied to the control grid G2 of the second section of tube V9 which together with its associated circuit form a current amplifier stage. The output of the current amplifier stage is applied to the control grid of tube V21 which together with its associated circuit form a conventional amplifier circuit and the vertical deflection coils of the cathode ray tube are included in the output circuit of that amplifier stage. Since the vertical deflection coils of the cathode ray tube are connected in the plate circuit of tube V21, saturation of these coils will occur if the plate current of this stage is permitted to become excessive while the high power peak voltage of the main lobe of the test pattern is being received. It is necessary, therefore, to include a limiter stage to prevent such an occurrence. Tube V10 and its associated circuit are incorporated for this purpose. Should the grid G2 of tube V9 exceed the positive limit to which potentiometer P7 has been set, conduction of the diode V10 will occur, thus effectively limiting the positive value to which grid G2 of tube V9 will rise. The limit is determined by the negative voltage applied to the plates of tube V10 by control potentiometer P7.

Calibration of the vertical scale

Calibration of the vertical scale of the cathode ray tube is accomplished as follows: The antenna to be tested is excited by a low power continuous wave signal of the proper frequency and then permitted to rotate at its normal operating speed. For the purposes of explanation, it will be assumed that this speed is four revolutions per minute. No further adjustments are required at the antenna upon completion of these two steps.

At the recording site the pick-up antenna is oriented for maximum signal pick up and the local oscillator frequency of the receiver is adjusted to produce an intermediate frequency required by the intermediate frequency amplifier. The electron beam of the cathode ray tube should then indicate the presence of the main lobe of the test pattern by a sharp vertical deflection as the main lobe passes the pick-up antenna.

The intermediate frequency amplifier is then switched to the low gain operating level and the maximum deflection of the beam is set for approximately three-fourths of the indicator screen height by the low gain amplifier gain control. This maximum point of vertical deflection of the beam is then marked on a blank calibration card next to the screen and becomes the zero level point or maximum power point of the test pattern. In radar equipment, this point is the peak value of the main lobe of the pattern or 100% level. Since all amplitude measurements of the side and back lobes are expressed in terms of main lobe peak power, the pick-up antenna is then disconnected from the receiver input and an accurately calibrated signal generator of the operating frequency is used to energize the receiver and to deflect the indicator beam. The beam is then brought back to its zero level or 100% power point by adjusting the output control of the signal generator and the absolute power is recorded as indicated by the signal generator attenuator calibration scale. The output of the signal generator is then decreased in three decibel steps and each point is recorded on the indicator calibration card. This process is continued until no further decrease in beam position is noted for a decrease in signal generator output.

Previous experience indicates that this low level operating scale usually has a range of approximately 15 decibels. When this point has been reached the intermediate amplifier is then switched to the high gain operating level. This will cause the electron beam to move to the top of the screen again. The maximum position of the beam is determined by the high gain operating control of the amplifier. When this position has been determined it then becomes the equivalent power point of the lower scale value or approximately the 15 decibel position. This point is then recorded on the high scale calibration card of the indicator and the process of decreasing the signal generator output in three decibel steps is continued until no further decrease of beam position is noted for a decrease in signal generator output. This level is usually approximately 30 to 40 decibels down depending upon receiver sensitivity and the power output of the energizing signal of the antenna under test.

This completes calibration of the vertical scale of the oscillograph indicator and power measurements can then be made over a range of approximately 30 decibels.

Calibration of horizontal sweep

Calibration of the horizontal deflection scale is required to determine the angular displacement of side and back lobes of the test pattern as well as main lobe beam width. The procedure for accomplishing this calibration is as follows: Upon determination of the exact speed of rotation of the antenna under test, the frequency of marker oscillator of the intensity circuit is adjusted to a frequency value given by:

$$F = 24S$$

where:

F is oscillator frequency in C. P. S.
S is antenna rotation speed in R. P. M.

Thus, at four revolutions per minute, the marker oscillator frequency is:

$$F = 24 \times 4 = 96 \ C. \ P. \ S.$$

Referring to Figure 5b, the marker oscillator signal frequency is obtained at test point TP3 when switch SW7 is closed.

Figure 4:
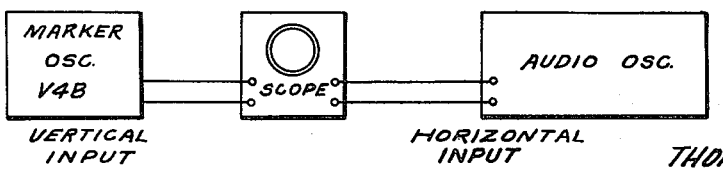
Fig. 4 is a block diagram of the apparatus used in the calibrating the sweep circuits of the oscilloscope.

This signal is applied to the vertical deflection amplifier input of a standard test oscilloscope as shown in Figure 4, and the output of an accurately calibrated audio frequency oscillator is applied to the horizontal deflection amplifier of the test oscilloscope. The output frequency of the audio frequency oscillator is then adjusted to 96 cycles per second and the frequency of the marker oscillator V4B of the intensity circuit is adjusted to 96 cycles per second by frequency control P14. This condition will be indicated by the normal circular Lissajous figure on the test oscilloscope screen. As shown in Figure 5b, the output frequency of the master oscillator is applied to V6 which produces a pulse for every four cycles of the marker oscillator frequency. This stage is adjusted by control P9. To accomplish this adjustment it is necessary to connect test point TP3 to TP11 which is in the control grid circuit of the first section of tube V9, and place switch SW3 in the number 1 position. The manual trigger switch SW2 in the circuit of V1 is then operated. This will produce a horizontal deflection of the electron beam of the indicator revealing the sine wave frequency of the master oscillator V4B. The output pulse frequency of V6 is then adjusted by P9 until a bright spot appears on the crest of every fourth cycle of the sine waveform. The pulse output frequency of V6 is then one-fourth the marker oscillator frequency or 24 cycles per second. The pulse frequency can then be utilized as a source of one degree marker points at the rotation speed of four revolutions per minute. The output pulse frequency is then further divided by V7 to produce ten degree marker pulses. This stage is adjusted by P10. To accomplish this adjustment test point TP8 is connected to test point TP11 and switch SW3 is moved to the number 2 position as shown in Figure 7b.

The manual trigger switch SW2 is then actuated causing a horizontal deflection of the electron beam of the indicator. As the beam sweeps a series of pulses resulting from the operation of V6 will be visible on the indicator screen. The pulsed output of V7 will appear as brightened spots at the top of every tenth pulse when P10 is correctly adjusted. This stage is then dividing the output frequency of the one degree marker pulse source by 10. The output pulse frequency of V7 is then utilized as a source of ten degree marker pulses. The remaining divider stage V8 is then set-up to divide the output frequency of V7 by three, thus providing a source of thirty degree marker pulses. This stage V8 is adjusted by connecting test point TP9 to test point TP11 and placing switch SW3 in the number 3 position. The manual trigger switch SW2 is then actuated, causing a horizontal deflection of electron beam. The pulse output of V7 is then visible on the indicator screen. P11 is then adjusted to produce a brightened spot at the top of every third pulse.

When this condition has been achieved V8 is dividing the pulsed output frequency of V7 by three and providing a source of thirty degree marker pulses.

In the recording of the test pattern these marker pulses are displayed with no vertical deflection of the electron beam. The spacing of the marker pulses is then transferred to a blank horizontal calibration card at the lower edge of the indicator screen. Interpretation of the test pattern is then accomplished directly from the calibration card in use.

What is claimed is:

1. On oscillographic antenna pattern recorder for presenting the radiation pattern of a rotary antenna under test upon a cathode ray oscillograph screen in rectangular coordinates comprising, a receiver adapted to pick-up signals radiated from said antenna under test and producing a direct current output voltage proportional to the input signals, a cathode ray oscillograph, a horizontal sweep circuit connected to said receiver and to said cathode ray oscillograph and adapted to render the horizontal deflection of the oscillograph electron beam proportional to the degree of rotation through which the antenna under test is revolved, a vertical deflection circuit connected to said receiver and to said cathode ray oscillograph and providing a vertical deflection of the oscillograph electron beam which is proportional to power level variations of the rotary antenna pattern introduced into said receiver.

2. An oscillographic antenna pattern recorder for presenting the radiation pattern of a rotary antenna under test upon a cathode ray oscillograph screen in rectangular coordinates comprising, a receiver adapted to pick-up signals radiated from said antenna under test and producing a direct current output voltage proportional to the input signals, a cathode ray oscillograph, a horizontal sweep circuit connected to said receiver and to said cathode ray oscillograph and adapted to render the horizontal deflection of the oscillograph electron beam proportional to the degree of rotation through which the antenna under test is revolved, a vertical deflection circuit connected to said receiver and to said cathode ray oscillograph and providing a vertical deflection of the oscillograph electron beam which is proportional to power level variations of the rotary antenna pattern introduced into said receiver, and a marker circuit comprising a marker oscillator which is synchronized with the rotation of the test antenna pattern and adapted to provide calibration markers for the horizontal deflection of the oscillograph electron beam.

3. An oscillographic antenna pattern recorder for presenting the radiation pattern of a rotary antenna under test upon a cathode ray oscillograph screen in rectangular coordinates comprising, a pick-up antenna located within the field of the rotating radiation pattern of the antenna under test, a receiver connected to said pick-up antenna and producing a direct current output voltage proportional to the input signal at said pick-up antenna, a horizontal sweep circuit, a vertical deflection circuit and a marker circuit, each connected to the output circuit of said receiver, a cathode ray oscillograph connected to said horizontal sweep circuit, vertical deflection circuit and marker circuits, said sweep circuit being adapted to synchronize the speed of the oscillograph electron beam as it moves horizontally across the screen and the speed at which the antenna is rotating, so that the horizontal deflection of the oscillograph electron beam is proportional to the degree of rotation through which the antenna under test is revolved, said marker circuit producing indications on the horizontal baseline of said oscillograph screen for determining said degree of rotation, and said vertical deflection circuit being capable of producing a vertical deflection of the oscillograph electron beam which is proportional to, and indicative of, power level variations of the rotary antenna pattern introduced into said receiver.

4. An oscillographic antenna pattern recorder for presenting the radiation pattern of a rotary antenna under test upon a cathode ray oscillograph screen in rectangular coordinates comprising, a pick-up antenna located within the radiation field of the rotating antenna under test; means for producing a direct current voltage which varies in magnitude as a function of the variations in the power received by said pick-up antenna; a cathode ray oscilloscope having means to form an electron beam; a first beam deflecting means to cause said beam to be deflected in a first predetermined direction and at a predetermined rate in synchronism with the recurrence rate of said direct current voltage and a second beam deflecting means to cause said beam to be deflected in a second predetermined direction as a function of the variations in magnitude of said direct current voltage.

5. An oscillographic antenna pattern recorder for presenting the radiation pattern of a rotary antenna under test upon a cathode ray oscillograph screen in rectangular coordinates comprising; a pick-up antenna located within the radiation field of the rotating antenna under test; means for producing a direct current voltage which varies in magnitude as a function of the variation in the power received by said pick-up antenna; means to produce a series of voltage pulses, each pulse of said series of pulses being coincident in time with the variation in said direct current voltage representative of the main lobe of radiation from said antenna under test; means to produce a series of trigger pulses, one trigger pulse for each second pulse of said series of voltage pulses, means to delay said series of trigger pulses by a time such as to cause said trigger pulse to occur at a predetermined position of said rotating antenna under test, a cathode ray tube having means to form an electron beam, sweep means to deflect said electron beam in a first predetermined direction in response to each of said delayed trigger pulses, and means to deflect said electron beam in a second predetermined direction as a function of the variation in said direct current voltage.

6. An oscillographic antenna pattern recorder for presenting the radiation pattern of a rotary antenna under test upon a cathode ray oscillograph screen in rectangular coordinates comprising; a pick-up antenna adapted to be located within the radiation field of a rotating antenna under test; means for producing a direct current voltage which varies in a magnitude as a function of the variations in the power level received by said pick-up antenna whereby when said pickup antenna is located in the radiation field of said rotating antenna under test, a direct current voltage will be produced which varies in magnitude at a cyclic rate corresponding to the rotation of said antenna under test; a pulse shaping circuit for producing from said direct current voltage which varies in magnitude at a cyclic rate a series of voltage pulses in which each pulse is coincident in time with the variation in said direct current voltage representative of the main lobe of radiation from said antenna under test; a frequency divider circuit for producing from said series of voltage pulses a series of trigger pulses in which the number of trigger pulses is equal to the number of voltage pulses divided by a whole number; a cathode ray tube having means to form an electron beam, means to deflect said electron beam in a first predetermined direction and means to deflect said electron beam in a second predetermined direction; a sweep circuit for energizing said means to deflect said electron beam in a first predetermined direction; the output of said frequency divider circuit connected to said sweep circuit such that said beam is swept in said first predetermined direction and returned to its initial position each time there is an output pulse from said frequency divider circuit and circuit means to energize said means to deflect said electron beam in a second predetermined direction by said direct current voltage.

7. An oscillographic antenna pattern recorder according to claim 6 further including means synchronized by said trigger pulses for intensity modulating said electron beam at a predetermined rate.

References Cited in the file of this patent
UNITED STATES PATENTS

| | | |
|---|---|---|
| 2,320,908 | Busignies | June 1, 1943 |
| 2,406,406 | Sandretto et al. | Aug. 27, 1946 |
| 2,510,299 | Schramm | June 6, 1950 |
| 2,548,836 | Worthington | Apr. 10, 1951 |